United States Patent
Mao

(10) Patent No.: US 11,732,140 B2
(45) Date of Patent: Aug. 22, 2023

(54) ENVIRONMENT-FRIENDLY WALL PAINT FOR BUILDING AND PREPARATION METHOD THEREOF

(71) Applicant: HUNAN QIDIAOSHI MANUFACTURING CO., LTD., Wugang (CN)

(72) Inventor: Xiaowen Mao, Wugang (CN)

(73) Assignee: HUNAN QIDIAOSHI MANUFACTURING CO., LTD., Wugang (CN)

( * ) Notice: Subject to any disclaimer, the term of this patent is extended or adjusted under 35 U.S.C. 154(b) by 0 days.

(21) Appl. No.: 17/507,783

(22) Filed: Oct. 21, 2021

(65) Prior Publication Data
US 2023/0125595 A1   Apr. 27, 2023

(51) Int. Cl.
*C09D 1/04*   (2006.01)
*C09D 7/40*   (2018.01)
*C09D 7/63*   (2018.01)
*C09D 7/61*   (2018.01)
*C09D 5/03*   (2006.01)

(52) U.S. Cl.
CPC ............... *C09D 1/04* (2013.01); *C09D 5/031* (2013.01); *C09D 5/033* (2013.01); *C09D 7/61* (2018.01); *C09D 7/63* (2018.01); *C09D 7/69* (2018.01)

(58) Field of Classification Search
CPC .......... C09D 1/04; C09D 5/031; C09D 5/033; C09D 7/61; C09D 7/63; C09D 7/69
USPC .................................................. 106/287.34
See application file for complete search history.

(56) References Cited

FOREIGN PATENT DOCUMENTS

| CN | 104402347 B | * | 4/2016 | |
|---|---|---|---|---|
| CN | 108485419 A | * | 9/2018 | ........... C09D 133/00 |
| CN | 109762420 A | * | 5/2019 | |
| CN | 111484789 A | * | 8/2020 | ........... C09D 163/00 |

OTHER PUBLICATIONS

CN 104402347 B, originally published Apr. 2016 to Chen et al. (Year: 2016).*
CN 108485419 A, originally published Sep. 2018 to Wei et al. (Year: 2018).*
CN 111484789 A, originally published Aug. 2020 to Zhou (Year: 2020).*
CN 109762420 A, originally published May 2019 to Wang (Year: 2019).*

* cited by examiner

*Primary Examiner* — Stefanie J Cohen
*Assistant Examiner* — Ritu S Shirali
(74) *Attorney, Agent, or Firm* — Daniel M. Cohn; Howard M. Cohn

(57) ABSTRACT

The present invention discloses an environment-friendly wall paint for a building and a preparation method thereof. The wall paint comprises glue powder, silica gel, nano-montmorillonite composite powder, diatomite dispersion, nano-calcium silicate, nano-titanium dioxide, glass fiber powder, red clay, lime, water, lignin, acrylamide, bamboo charcoal powder, alfalfa meal, tobacco straw fiber powder, *Ligusticum chuanxiong Hort* extracting solution, *Agastache rugosa* extracting solution, mint extracting solution and natural plant essential oil. The wall paint disclosed by the present invention can be used for decorative coating of interior walls of the building, has the characteristics of strong adhesion, rapid drying, water and moisture resistance, no skinning, no shedding, no toxicity and no pollution, can purify indoor air, and also has the effects of heat preservation, heat insulation and fire prevention.

10 Claims, No Drawings

ENVIRONMENT-FRIENDLY WALL PAINT FOR BUILDING AND PREPARATION METHOD THEREOF

TECHNICAL FIELD

The present invention relates to the technical field of building paints, and more particularly to an environment-friendly wall paint for a building and a preparation method thereof.

BACKGROUND OF THE PRESENT INVENTION

With the development of economy and technology, people have put forward higher requirements for the performance of decoration materials of building walls. The traditional solvent-based building paint releases a large amount of VOC and free monomers, thereby seriously affecting the environment and human health. The water-based building paint uses water as a dispersion medium, and has the characteristics of health, environmental protection and excellent performance. At present, the water-based degree of the building paint has reached more than 80%, and the building paint of interior walls has been increasingly replaced by the water-based building paint. Therefore, how to develop and produce environmental-friendly, functional and high-grade water-based interior wall paint is of great significance to the healthy development of human life and the environment.

SUMMARY OF THE PRESENT INVENTION

The purpose of the present invention is to overcome the defects of the prior art to provide an environment-friendly wall paint for a building and a preparation method thereof.

To achieve the purpose above, the present invention adopts the following technical solution:

A preparation method of an environment-friendly wall paint for a building comprises the following steps:
(1) preparing various raw materials by weight for later use;
wherein 20-30 kg of glue powder, 8-12 kg of silica gel, 10-12 kg of nano-montmorillonite composite powder, 10-12 kg of diatomite dispersion, 2-6 kg of nano-calcium silicate, 4-6 kg of nano-titanium dioxide, 2-5 kg of glass fiber powder, 10-20 kg of red clay, 10-20 kg of lime, 30-40 kg of water, 2-5 kg of lignin, 4-8 kg of acrylamide, 2-5 kg of alfalfa meal, 2-5 kg of tobacco straw fiber powder, 2-8 kg of *Ligusticum chuanxiong Hort* extracting solution, 2-8 kg of *Agastache rugosa* extracting solution, 2-8 kg of mint extracting solution and 5-8 kg of natural plant essential oil;
(2) mixing and uniformly stirring the glue powder, the nano-montmorillonite composite powder, the nano-calcium silicate, the nano-titanium dioxide, the glass fiber powder, the red clay, the lime, the alfalfa meal and the tobacco straw fiber powder to obtain mixed powder;
(3) adding the mixed powder of step (2) into the water, stirring with a stirring tank, keeping stirring at rotation speed of 500-700 rpm, controlling the temperature as 70-80° C. and stirring time as 30-40 min, and cooling after stirring to maintain the temperature at 40-45° C. for 1-2 hours to obtain colloidal emulsion;
(4) adding the silica gel, the diatomite dispersion, the lignin and the acrylamide into the colloidal emulsion of step (3), and keeping stirring at rotation speed of 150-200 rpm; and
(5) continuing to add the *Ligusticum chuanxiong Hort* extracting solution, the *Agastache rugosa* extracting solution, the mint extracting solution and the natural plant essential oil, increasing the rotation speed of the stirring tank to 600-800 rpm and the stirring time to 30-40 min, and waiting until the paint is uniformly stirred without bubbles.

The preparation method of the glue powder is as follows: mixing 40-50 kg of light nano-calcium carbonate, 8-10 kg of hydroxypropyl methylcellulose, 2-4 kg of polyacrylamide, 5-8 kg of ethylene/vinyl acetate copolymer rubber powder, 8-10 kg of superplasticizer, 5-8 kg of attapulgite, 2-5 kg of methyl methacrylate, 10-12 kg of sodium silicate, 3-5 kg of citric acid powder and 15-20 kg of latex powder to prepare powder.

The preparation method of the nano-montmorillonite composite powder is as follows:
adding bentonite and zeolite powder into a sodium hydroxide solution with mass fraction of 10-15%; stirring and mixing uniformly; heating to 85-95° C.; stirring and crystallizing for 2-3 hours while maintaining the temperature; washing with ethylene glycol and then conducting centrifugal separation; taking out precipitates; putting the precipitates into an oven at 90-100° C. for drying; and then adding the dried precipitates into a jet mill for superfine jet pulverization to obtain the nano-montmorillonite composite powder of 200-300 meshes.

The preparation method of the diatomite dispersion is as follows:
calcining diatomite in a calcinator at 500-560° C. for 2-4 hours; taking out the diatomite; putting the diatomite into 10-15% hydrochloric acid solution for soaking for 3-5 hours; filtering the diatomite; taking out the diatomite; repeatedly washing the diatomite with clean water; drying; adding a dispersant for fine grinding; dissociating fine clay impurities contained in a frustule from diatom; then removing the fine clay impurities by centrifugal precipitation; conducting wet superfine pulverization; and then conducting surface treatment on the mixed solution to prepare the diatomite dispersion.

The preparation method of the tobacco straw fiber powder is as follows:
firstly, soaking tobacco straw in an alkali aqueous solution with a percentage concentration of 5-8% by weight at a temperature of 50-70° C.; after taking out the tobacco straw, repeatedly washing the tobacco straw with clean water until a pH value is neutral; drying; and then grinding for 1-2 hours to obtain powder of 200-300 meshes.

The natural plant essential oil is selected from the group consisting of one or a combination of lemon essential oil, violet essential oil, lily essential oil, jasmine essential oil and thyme essential oil.

The mesh number of the red clay is 150-200 meshes, and the mesh number of the lime is 200-300 meshes.

The nano-titanium dioxide is nano-sized anatase type titanium dioxide.

The superplasticizer is a powdered polycarboxylate superplasticizer.

A second aspect of the present invention provides an environment-friendly wall paint for a building, which consists of the following raw materials: 20-30 kg of glue powder, 8-12 kg of silica gel, 10-12 kg of nano-montmorillonite composite powder, 10-12 kg of diatomite dispersion, 2-6 kg of nano-calcium silicate, 4-6 kg of nano-titanium dioxide, 2-5 kg of glass fiber powder, 10-20 kg of red clay, 10-20 kg of lime, 30-40 kg of water, 2-5 kg of lignin, 4-8 kg of acrylamide, 2-5 kg of alfalfa meal, 2-5 kg of tobacco straw fiber powder, 2-8 kg of *Ligusticum chuanxiong Hort* extracting solution, 2-8 kg of *Agastache rugosa* extracting solution, 2-8 kg of mint extracting solution and 5-8 kg of natural plant essential oil.

Compared with the prior art, the present invention has the following beneficial effects:

1. The wall paint disclosed by the present invention can be used for decorative coating of interior walls of the building, has the characteristics of strong adhesion, rapid drying, water and moisture resistance, no skinning, no shedding, no toxicity, no harm and no pollution, can purify indoor air, and can change the color of the decorative paint of the interior walls of the building by adjusting a ratio of the red clay, the lime and the tobacco straw fiber powder; the raw materials do not contain harmful substances such as formaldehyde or benzene; and the wall paint is green, environmentally friendly and pollution-free, and also has the effects of heat preservation, heat insulation and fire prevention.
2. The present invention uses the glue powder and the silica gel for cooperation and assistance to serve as a synergistic adhesive, and at the same time, the red clay and the lime are matched to improve the adhesiveness and structural stability of the material; and a variety of raw materials can be combined together to improve the strength, aging resistance and abrasion resistance of the paint on the wall.
3. In the present invention, the nano-montmorillonite composite powder is added. The nano-montmorillonite composite powder of tiny particles can form a uniform and stable structure, which optimizes the compactness and stability of the paint and effectively enhances the strength of the paint. At the same time, the nano-montmorillonite composite powder has good thermal insulation performance, can improve the heating performance of the tobacco straw fiber powder and the alfalfa meal, and improves weather resistance, heat resistance and flame retardancy; and nano-montmorillonite can enhance water resistance and UV resistance, and enhance the crack resistance and adhesion of the paint.
4. In the present invention, the diatomite dispersion is added, has large specific surface area and strong water absorption capacity, has the functions of adjusting humidity and adsorbing toxic gases, and can provide excellent surface properties for the paint, increase the capacity and thickness and improve the adhesion, so that the drying time of the paint is reduced.
5. In the present invention, by adding the nano-calcium silicate in the paint, through the characteristics of high melting point and small thermal conductivity of the nano-calcium silicate, the prepared paint has poor thermal conductivity and good fire resistance. In addition, the synergistic gain of the nano-calcium silicate and the glass fiber powder can further reduce the thermal conductivity of the paint and play a role of heat preservation.
6. In the present invention, the glass fiber powder, the alfalfa meal, the lignin and the acrylamide are added to enhance and improve the crack resistance and corrosion resistance of the paint.
7. In the present invention, the tobacco straw fiber powder is added. The cost of the tobacco straw fiber powder is low, so that the paint has the effect of repelling mosquitoes and mildew, and can improve the color effect of the paint. The tobacco straw fiber powder has small average particle size and can be well filled in pores of cement particles, so that the paint is denser.
8. In the present invention, extracting solutions of traditional Chinese medicine of *Ligusticum chuanxiong Hort*, *Agastache rugosa* and mint are used, which not only can disperse the medicine aroma and remove odor, but also can resist viruses and purify the air; and the natural plant essential oil can also improve the smell of the paint and improve the comfort of users.
9. The nano-titanium dioxide of the present invention has high photoactivity, and can promote the decomposition of harmful gases such as formaldehyde, benzene and ammonia under irradiation of ultraviolet light and blue-violet light, so as to further improve indoor air quality.

DETAILED DESCRIPTION OF THE PRESENT INVENTION

Example 1

Example 1 of the present invention provides a preparation method of an environment-friendly wall paint for a building, comprising the following steps:

(1) preparing various raw materials by weight for later use;

wherein 20 kg of glue powder, 8 kg of silica gel, 10 kg of nano-montmorillonite composite powder, 10 kg of diatomite dispersion, 2 kg of nano-calcium silicate, 4 kg of nano-titanium dioxide, 2 kg of glass fiber powder, 10 kg of red clay, 10 kg of lime, 30 kg of water, 2 kg of lignin, 4 kg of acrylamide, 2 kg of alfalfa meal, 2 kg of tobacco straw fiber powder, 2 kg of *Ligusticum chuanxiong Hort* extracting solution, 2 kg of *Agastache rugosa* extracting solution, 2 kg of mint extracting solution and 5 kg of natural plant essential oil;

(2) mixing and uniformly stirring the glue powder, the nano-montmorillonite composite powder, the nano-calcium silicate, the nano-titanium dioxide, the glass fiber powder, the red clay, the lime, the alfalfa meal and the tobacco straw fiber powder to obtain mixed powder;

(3) adding the mixed powder of step (2) into the water, stirring with a stirring tank, keeping stirring at rotation speed of 500 rpm, controlling the temperature as 70° C. and stirring time as 30 min, and cooling after stirring to maintain the temperature at 40° C. for 1 hour to obtain colloidal emulsion;

(4) adding the silica gel, the diatomite dispersion, the lignin and the acrylamide into the colloidal emulsion of step (3), and keeping stirring at rotation speed of 150 rpm; and (5) continuing to add the *Ligusticum chuanxiong Hort* extracting solution, the *Agastache rugosa* extracting solution, the mint extracting solution and the natural plant essential oil, increasing the rotation speed of the stirring tank to 600 rpm and the stirring time to 30 min, and waiting until the paint is uniformly stirred without bubbles.

The preparation method of the glue powder is as follows:
mixing 40 kg of light nano-calcium carbonate, 8 kg of hydroxypropyl methylcellulose, 2 kg of polyacrylamide, 5 kg of ethylene/vinyl acetate copolymer rubber powder, 8 kg of superplasticizer, 5 kg of attapulgite, 2 kg of methyl methacrylate, 10 kg of sodium silicate, 3 kg of citric acid powder and 15 kg of latex powder to prepare powder.

The preparation method of the nano-montmorillonite composite powder is as follows:

adding bentonite and zeolite powder into a sodium hydroxide solution with mass fraction of 10%; stirring and mixing uniformly; heating to 85° C.; stirring and crystallizing for 2 hours while maintaining the temperature; washing with ethylene glycol and then conducting centrifugal separation; taking out precipitates; putting the precipitates into an oven at 90° C. for drying; and then adding the dried precipitates into a jet mill for superfine jet pulverization to obtain the nano-montmorillonite composite powder of 200 meshes.

The preparation method of the diatomite dispersion is as follows:

calcining diatomite in a calcinator at 500° C. for 2 hours; taking out the diatomite; putting the diatomite into 10% hydrochloric acid solution for soaking for 3 hours; filtering the diatomite; taking out the diatomite; repeatedly washing the diatomite with clean water; drying; adding a dispersant for fine grinding; dissociating fine clay impurities contained in a frustule from diatom; then removing the fine clay impurities by centrifugal precipitation; conducting wet superfine pulverization; and then conducting surface treatment on the mixed solution to prepare the diatomite dispersion.

The preparation method of the tobacco straw fiber powder is as follows:

firstly, soaking tobacco straw in an alkali aqueous solution with a percentage concentration of 5% by weight at a temperature of 50° C.; after taking out the tobacco straw, repeatedly washing the tobacco straw with clean water until a pH value is neutral; drying; and then grinding for 1 hour to obtain powder of 200 meshes.

The natural plant essential oil is the lemon essential oil. The nano-titanium dioxide is the nano-sized anatase type titanium dioxide. The superplasticizer is configured as the powdered polycarboxylate superplasticizer.

The mesh number of the red clay is 150 meshes, and the mesh number of the lime is 200 meshes.

Example 2

Example 2 of the present invention provides a preparation method of an environment-friendly wall paint for a building, comprising the following steps:

(1) preparing various raw materials by weight for later use;

wherein 25 kg of glue powder, 10 kg of silica gel, 11 kg of nano-montmorillonite composite powder, 11 kg of diatomite dispersion, 5 kg of nano-calcium silicate, 5 kg of nano-titanium dioxide, 4 kg of glass fiber powder, 15 kg of red clay, 15 kg of lime, 35 kg of water, 3 kg of lignin, 5 kg of acrylamide, 3 kg of alfalfa meal, 4 kg of tobacco straw fiber powder, 5 kg of *Ligusticum chuanxiong Hort* extracting solution, 5 kg of *Agastache rugosa* extracting solution, 5 kg of mint extracting solution and 6 kg of natural plant essential oil;

(2) mixing and uniformly stirring the glue powder, the nano-montmorillonite composite powder, the nano-calcium silicate, the nano-titanium dioxide, the glass fiber powder, the red clay, the lime, the alfalfa meal and the tobacco straw fiber powder to obtain mixed powder;

(3) adding the mixed powder of step (2) into the water, stirring with a stirring tank, keeping stirring at rotation speed of 600 rpm, controlling the temperature as 75° C. and stirring time as 35 min, and cooling after stirring to maintain the temperature at 42° C. for 1.5 hour to obtain colloidal emulsion;

(4) adding the silica gel, the diatomite dispersion, the lignin and the acrylamide into the colloidal emulsion of step (3), and keeping stirring at rotation speed of 180 rpm; and (5) continuing to add the *Ligusticum chuanxiong Hort* extracting solution, the *Agastache rugosa* extracting solution, the mint extracting solution and the natural plant essential oil, increasing the rotation speed of the stirring tank to 700 rpm and the stirring time to 35 min, and waiting until the paint is uniformly stirred without bubbles.

The preparation method of the glue powder is as follows:

mixing 45 kg of light nano-calcium carbonate, 9 kg of hydroxypropyl methylcellulose, 3 kg of polyacrylamide, 6 kg of ethylene/vinyl acetate copolymer rubber powder, 9 kg of superplasticizer, 6 kg of attapulgite, 3 kg of methyl methacrylate, 11 kg of sodium silicate, 4 kg of citric acid powder and 18 kg of latex powder to prepare powder.

The preparation method of the nano-montmorillonite composite powder is as follows:

adding bentonite and zeolite powder into a sodium hydroxide solution with mass fraction of 12%; stirring and mixing uniformly; heating to 90° C.; stirring and crystallizing for 2.5 hours while maintaining the temperature; washing with ethylene glycol and then conducting centrifugal separation; taking out precipitates; putting the precipitates into an oven at 95° C. for drying; and then adding the dried precipitates into a jet mill for superfine jet pulverization to obtain the nano-montmorillonite composite powder of 250 meshes.

The preparation method of the diatomite dispersion is as follows:

calcining diatomite in a calcinator at 520° C. for 3 hours; taking out the diatomite; putting the diatomite into 12% hydrochloric acid solution for soaking for 4 hours; filtering the diatomite; taking out the diatomite; repeatedly washing the diatomite with clean water; drying; adding a dispersant for fine grinding; dissociating fine clay impurities contained in a frustule from diatom; then removing the fine clay impurities by centrifugal precipitation; conducting wet superfine pulverization; and then conducting surface treatment on the mixed solution to prepare the diatomite dispersion.

The preparation method of the tobacco straw fiber powder is as follows:

firstly, soaking tobacco straw in an alkali aqueous solution with a percentage concentration of 6% by weight at a temperature of 60° C.; after taking out the tobacco straw, repeatedly washing the tobacco straw with clean water until a pH value is neutral; drying; and then grinding for 1.5 hour to obtain powder of 250 meshes.

The natural plant essential oil is the lemon essential oil. The nano-titanium dioxide is the nano-sized anatase type titanium dioxide. The superplasticizer is configured as the powdered polycarboxylate superplasticizer.

The mesh number of the red clay is 170 meshes, and the mesh number of the lime is 250 meshes.

Example 3

Example 3 of the present invention provides a preparation method of an environment-friendly wall paint for a building, comprising the following steps:
(1) preparing various raw materials by weight for later use;
wherein 30 kg of glue powder, 12 kg of silica gel, 12 kg of nano-montmorillonite composite powder, 12 kg of diatomite dispersion, 6 kg of nano-calcium silicate, 6 kg of nano-titanium dioxide, 5 kg of glass fiber powder, 20 kg of red clay, 20 kg of lime, 40 kg of water, 5 kg of lignin, 8 kg of acrylamide, 5 kg of alfalfa meal, 5 kg of tobacco straw fiber powder, 8 kg of *Ligusticum chuanxiong Hort* extracting solution, 8 kg of *Agastache rugosa* extracting solution, 8 kg of mint extracting solution and 8 kg of natural plant essential oil;
(2) mixing and uniformly stirring the glue powder, the nano-montmorillonite composite powder, the nano-calcium silicate, the nano-titanium dioxide, the glass fiber powder, the red clay, the lime, the alfalfa meal and the tobacco straw fiber powder to obtain mixed powder;
(3) adding the mixed powder of step (2) into the water, stirring with a stirring tank, keeping stirring at rotation speed of 700 rpm, controlling the temperature as 80° C. and stirring time as 40 min, and cooling after stirring to maintain the temperature at 45° C. for 2 hour to obtain colloidal emulsion;
(4) adding the silica gel, the diatomite dispersion, the lignin and the acrylamide into the colloidal emulsion of step (3), and keeping stirring at rotation speed of 200 rpm; and
(5) continuing to add the *Ligusticum chuanxiong Hort* extracting solution, the *Agastache rugosa* extracting solution, the mint extracting solution and the natural plant essential oil, increasing the rotation speed of the stirring tank to 800 rpm and the stirring time to 40 min, and waiting until the paint is uniformly stirred without bubbles.

The preparation method of the glue powder is as follows: mixing 50 kg of light nano-calcium carbonate, 10 kg of hydroxypropyl methylcellulose, 4 kg of polyacrylamide, 8 kg of ethylene/vinyl acetate copolymer rubber powder, 10 kg of superplasticizer, 8 kg of attapulgite, 5 kg of methyl methacrylate, 12 kg of sodium silicate, 5 kg of citric acid powder and 20 kg of latex powder to prepare powder.

The preparation method of the nano-montmorillonite composite powder is as follows:
adding bentonite and zeolite powder into a sodium hydroxide solution with mass fraction of 15%; stirring and mixing uniformly; heating to 95° C.; stirring and crystallizing for 3 hours while maintaining the temperature; washing with ethylene glycol and then conducting centrifugal separation; taking out precipitates; putting the precipitates into an oven at 100° C. for drying; and then adding the dried precipitates into a jet mill for superfine jet pulverization to obtain the nano-montmorillonite composite powder of 300 meshes.

The preparation method of the diatomite dispersion is as follows:
calcining diatomite in a calcinator at 560° C. for 4 hours; taking out the diatomite; putting the diatomite into 15% hydrochloric acid solution for soaking for 5 hours; filtering the diatomite; taking out the diatomite; repeatedly washing the diatomite with clean water; drying; adding a dispersant for fine grinding; dissociating fine clay impurities contained in a frustule from diatom; then removing the fine clay impurities by centrifugal precipitation; conducting wet superfine pulverization; and then conducting surface treatment on the mixed solution to prepare the diatomite dispersion.

The preparation method of the tobacco straw fiber powder is as follows:
firstly, soaking tobacco straw in an alkali aqueous solution with a percentage concentration of 8% by weight at a temperature of 70° C.; after taking out the tobacco straw, repeatedly washing the tobacco straw with clean water until a pH value is neutral; drying; and then grinding for 2 hour to obtain powder of 300 meshes.

The natural plant essential oil is configured as the lemon essential oil. The nano-titanium dioxide is configured as the nano-sized anatase type titanium dioxide. The superplasticizer is configured as the powdered polycarboxylate superplasticizer.

The mesh number of the red clay is 200 meshes, and the mesh number of the lime is 300 meshes.

The example above is a preferred embodiment of the present invention. However, the embodiment of the present invention is not limited by the example above. Any other change, modification, replacement, combination and simplification made without departing from the spiritual essence and principle of the present invention shall be equivalent substitution modes, and shall be included within the protection scope of the present invention.

What is claimed is:
1. A preparation method of an environment-friendly wall paint for a building, comprising the following steps:
(1) preparing various raw materials by weight for later use;
wherein 20-30 kg of glue powder, 8-12 kg of silica gel, 10-12 kg of nano-montmorillonite composite powder, 10-12 kg of diatomite dispersion, 2-6 kg of nano-calcium silicate, 4-6 kg of nano-titanium dioxide, 2-5 kg of glass fiber powder, 10-20 kg of red clay, 10-20 kg of lime, 30-40 kg of water, 2-5 kg of lignin, 4-8 kg of acrylamide, 2-5 kg of alfalfa meal, 2-5 kg of tobacco straw fiber powder, 2-8 kg of *Ligusticum chuanxiong Hort* extracting solution, 2-8 kg of *Agastache rugosa* extracting solution, 2-8 kg of mint extracting solution, and 5-8 kg of natural plant essential oil;
(2) mixing and uniformly stirring the glue powder, the nano-montmorillonite composite powder, the nano-calcium silicate, the nano-titanium dioxide, the glass fiber powder, the red clay, the lime, the alfalfa meal and the tobacco straw fiber powder to obtain mixed powder;
(3) adding the mixed powder of step (2) into the water, stirring in a stirring tank at rotation speed of 500-700 rpm, at a temperature of 70-80° C. and stirring time of 30-40 min, and cooling after stirring to maintain a temperature at 40-45° C. for 1-2 hours to obtain colloidal emulsion;
(4) adding the silica gel, the diatomite dispersion, the lignin and the acrylamide into the colloidal emulsion of step (3), and keeping stirring at rotation speed of 150-200 rpm; and
(5) continuing to add the *Ligusticum chuanxiong Hort* extracting solution, the *Agastache rugosa* extracting solution, the mint extracting solution and the natural plant essential oil, increasing the rotation speed of the stirring tank to 600-800 rpm and the stirring time to 30-40 min, and waiting until the environment-friendly wall paint is uniformly stirred without bubbles.

2. The preparation method of the environment-friendly wall paint for the building according to claim 1, wherein the preparation method of the glue powder is as follows:

mixing 40-50 kg of light nano-calcium carbonate, 8-10 kg of hydroxypropyl methylcellulose, 2-4 kg of polyacrylamide, 5-8 kg of ethylene/vinyl acetate copolymer rubber powder, 8-10 kg of superplasticizer, 5-8 kg of attapulgite, 2-5 kg of methyl methacrylate, 10-12 kg of sodium silicate, 3-5 kg of citric acid powder and 15-20 kg of latex powder to prepare powder.

3. The preparation method of the environment-friendly wall paint for the building according to claim 1, wherein the preparation method of the nano-montmorillonite composite powder is as follows:

adding bentonite and zeolite powder into a sodium hydroxide solution with mass fraction of 10-15%; stirring and mixing uniformly; heating to 85-95° C.; stirring and crystallizing for 2-3 hours while maintaining the temperature; washing with ethylene glycol and then conducting centrifugal separation; taking out precipitates; putting the precipitates into an oven at 90-100° C. for drying; and then adding the dried precipitates into a jet mill for superfine jet pulverization to obtain the nano-montmorillonite composite powder of 200-300 meshes.

4. The preparation method of the environment-friendly wall paint for the building according to claim 1, wherein the preparation method of the diatomite dispersion is as follows:

calcining diatomite in a calcinator at 500-560° C. for 2-4 hours; taking out the diatomite; putting the diatomite into 10-15% hydrochloric acid solution for soaking for 3-5 hours; filtering the diatomite; taking out the diatomite; repeatedly washing the diatomite with clean water; drying; adding a dispersant for fine grinding; dissociating fine clay impurities contained in a frustule from diatom; then removing the fine clay impurities by centrifugal precipitation; conducting wet superfine pulverization; and then conducting surface treatment on the mixed solution to prepare the diatomite dispersion.

5. The preparation method of the environment-friendly wall paint for the building according to claim 1, wherein the preparation method of the tobacco straw fiber powder is as follows:

firstly, soaking tobacco straw in an alkali aqueous solution with a percentage concentration of 5-8% by weight at a temperature of 50-70° C.; after taking out the tobacco straw, repeatedly washing the tobacco straw with clean water until a pH value is neutral; drying; and then grinding for 1-2 hours to obtain powder of 200-300 meshes.

6. The preparation method of the environment-friendly wall paint for the building according to claim 1, wherein the natural plant essential oil is selected from the group consisting of one or a combination of lemon essential oil, violet essential oil, lily essential oil, jasmine essential oil and thyme essential oil.

7. The preparation method of the environment-friendly wall paint for the building according to claim 1, wherein the mesh number of the red clay is 150-200 meshes, and the mesh number of the lime is 200-300 meshes.

8. The preparation method of the environment-friendly wall paint for the building according to claim 1, wherein the nano-titanium dioxide is nano-sized anatase titanium dioxide.

9. The preparation method of the environment-friendly wall paint for the building according to claim 2, wherein the superplasticizer is a powdered polycarboxylate superplasticizer.

10. An environment-friendly wall paint for a building, which consists of the following raw materials: 20-30 kg of glue powder, 8-12 kg of silica gel, 10-12 kg of nano-montmorillonite composite powder, 10-12 kg of diatomite dispersion, 2-6 kg of nano-calcium silicate, 4-6 kg of nano-titanium dioxide, 2-5 kg of glass fiber powder, 10-20 kg of red clay, 10-20 kg of lime, 30-40 kg of water, 2-5 kg of lignin, 4-8 kg of acrylamide, 2-5 kg of alfalfa meal, 2-5 kg of tobacco straw fiber powder, 2-8 kg of *Ligusticum chuanxiong Hort* extracting solution, 2-8 kg of *Agastache rugosa* extracting solution, 2-8 kg of mint extracting solution, and 5-8 kg of natural plant essential oil.

\* \* \* \* \*